United States Patent

McIntyre

[11] 4,269,073
[45] May 26, 1981

[54] GYROSCOPE CLOSED-LOOP SPEED CONTROLLER

[75] Inventor: Melville D. McIntyre, Bellevue, Wash.

[73] Assignee: The Boeing Company, Seattle, Wash.

[21] Appl. No.: 927,453

[22] Filed: Jul. 24, 1978

[51] Int. Cl.³ .................. G01C 19/08; H02P 7/00
[52] U.S. Cl. .................................. 74/5.7; 318/317; 318/318
[58] Field of Search .............. 74/5.7; 318/309, 702, 318/714, 318, 317

[56] References Cited

U.S. PATENT DOCUMENTS

| | | | |
|---|---|---|---|
| 3,167,702 | 1/1965 | Schonung et al. | 318/702 |
| 3,197,679 | 7/1965 | Phillips et al. | 318/702 |
| 3,238,432 | 3/1966 | Amberger | 74/5.7 |
| 3,538,408 | 11/1970 | Peterson | 318/702 |
| 3,609,488 | 9/1971 | Sampson et al. | 318/318 X |
| 3,628,111 | 12/1971 | Goto | 318/702 |
| 3,667,013 | 5/1972 | Bicking | 318/702 |
| 3,721,973 | 3/1973 | Sundberg et al. | 318/702 |
| 3,794,894 | 2/1974 | Van Leer | 318/702 |
| 3,813,589 | 5/1974 | Boice | 318/702 |
| 3,829,747 | 8/1974 | Woolfson et al. | 318/314 X |
| 3,988,653 | 10/1976 | Clurman | 318/702 |

*Primary Examiner*—Rodney H. Bonck

*Attorney, Agent, or Firm*—Christensen, O'Connor, Johnson & Kindness

[57] ABSTRACT

A closed-loop controller for controlling the frequency of the power applied to a gyroscope synchronous motor to rotate the seismic mass (wheel) of the gyro so as to compensate for movement of the gyro case about the spin axis of the gyro is disclosed. The controller includes a sensor for sensing fluctuations in the current drawn by the gyro, said fluctuations being directly related to the fluctuations in the load angle of the gyro caused by movement of the gyro case about the spin axis. The current fluctuations create an analog voltage, which is amplified by several orders of magnitude. The result is used to modulate the frequency of the applied power so as to compensate for the load angle fluctuations caused by case movement about the spin axis. In essence, the controller reduces the frequency of the hunting mode of the gyro to a level below which movement of the gyro case about its spin axis has substantially no undesirable effect. In addition, the controller phase shifts the feedback modulation signal so as to damp hunting excursions at the lower hunting mode frequency. Finally, noise signals, particularly noise signals at the motor excitation frequency, are filtered out to prevent such signals from saturating the feedback electronics.

23 Claims, 6 Drawing Figures

GYROSCOPE CLOSED-LOOP SPEED CONTROLLER

BACKGROUND OF THE INVENTION

This invention is directed to gyroscopes and, more particularly, to control systems for controlling the rate of rotation of the spinning mass (wheel) of a gyroscope motor such that the spin rate remains constant in inertial space.

Gyroscopes are widely used in navigation and control systems to provide information about the rate of movement of the vehicle with which they are associated about three orthogonal axes, normally referred to as the yaw, roll and pitch axes. Depending upon the accuracy required, gyros vary from relatively inexpensive, low accuracy mechanisms to relatively expensive, high-precision mechanisms. Regardless of their expense and accuracy, most presently available rate sensors include a spinning mass. The spinning mass, or wheel, of a rate gyro may be continuously torqued by a rebalance servo so that its spin axis is maintained fixed relative to fixed reference, such as a platform in a platform inertial guidance and navigation system or the vehicle in a strap-down inertial guidance and navigation system. In either system, when gyros are used in long-range navigation systems, such as the systems used on long-range aircraft, the servo's torquer scale factor must be extremely stable and precisely known. The required accuracy is a few parts per million. The torquer scale factor is inversely proportional to the spin speed (angular momentum) of the spinning mass of the gyro. In this regard, spin speed refers to the angular velocity of the gyro with respect to inertial space, not with respect to the vehicle. As a result, in order for the torquer scale factor to be extremely stable and precisely known, the rotational speed of the spinning mass in inertial space must either be known very accurately at all times or, preferably, held very constant at a known speed.

In a typical gyro, used in an aircraft inertial navigation system, for example, the gyro wheel or spinning mass is driven directly by a polyphase synchronous motor. The stator of the polyphase synchronous motor, which includes the armature windings, is mounted in the case of the gyro. In a conventional manner, the armature windings are excited by a very stable frequency source and set up a rotating field, which is followed by the rotor field. As a result, the gyro wheel rotates at the same speed as the speed of the rotating field created by the armature windings. (Of course, a load angle, $\phi$, exists between the rotor field and the rotating field of the armature winding.) Since the speed of the rotating field is relative to the armature windings, which are mounted in the gyro case, and since the rotating magnetic field speed is proportional to the frequency of the polyphase source, if the frequency of the polyphase source is maintained highly stable at a known value, the speed of the gyro wheel is maintained at a highly stable known value in inertial space. Of course, this result is only true if the gyro case and, thus, the armature windings do not rotate about the gyro spin axis. If the gyro case does rotate about the gyro spin axis owing to the movement of the vehicle, the speed of the gyro tends to remain constant with respect to the moving vehicle, not with respect to inertial space.

In platform inertial guidance and navigation systems, gyro case rotation about the gyro spin axis is prevented because the platform on which the gyros are mounted remains fixed in inertial space. This benefit, enjoyed by platform systems, does not apply to strapdown systems because such systems do not include a platform that remains fixed in inertial space. Rather, in a strapdown inertial guidance and navigation system, the cases of the gyros are attached to the body of the vehicle. As a result, the gyro spin axes are forced to follow the movement of the vehicle. Consequently, when the vehicle rotates about the spin axis of a particular gyro, the speed of the rotating armature field of the gyro no longer remains constant with respect to inertial space. Rather, the rotational motion of the vehicle about the spin axis of the gyro will either increase or decrease the speed of the armature field and, thus, the speed of the gyro wheel relative to inertial space.

Since vehicles move in a random fashion as a result of many external conditions, strapdown gyro cases rotate about their spin axes in a random manner. Because case movement is random, the instantaneous angular velocity of the rotating armature field varies in a random manner.

The foregoing undesirable feature (i.e., random variations in gyro wheel speed due to vehicular motion) of strapdown rate gyros using synchronous motors is compounded by the undesirable dynamic characteristics of the gyro motor. More specifically, when the gyro case displays any rotational motion about the gyro's spin axis, this motion excites the natural or hunting frequency of the synchronous motor. When this motion is at a frequency near the hunting frequency (usually one to five Hertz depending upon the type of gyro), the gyro load angle fluctuations become very large because the motor is lightly damped. The gyro load angle fluctuations further contribute to the deviation of the gyro wheel speed from a constant inertial angular velocity.

The worst effect of gyro wheel speed variations on the accuracy of inertial navigation is observed when the vehicle on which the gyro is mounted exhibits an oscillatory angular motion which has a vector component both along the gyro spin axis and along an input axis of the gyro. When such oscillatory angular motion occurs, the gyro experiences a slightly different scale factor in each half-cycle of the oscillation, resulting in a small unidirectional drift or bias effect. This unidirectional bias effect is sometimes referred to as "motor dynamics error". The magnitude of this error is too large to be tolerated in inertial navigation systems whose total gyro bias must be less than 0.01°/hour.

In the past, various proposals have been made to overcome and eliminate the errors created by movement of a gyro case about the spin axis of the gyro. These proposals can be grouped under two approaches. The first approach maintains the frequency of the gyro motor power supply constant and measures changes in inertial speed from a constant inertial speed. The second approach varies or modulates the frequency of the gyro motor power supply in such a way that variations in the rotational speed of the armature field caused by vehicle movement about the spin axis of the gyro are compensated. If compensation for such movement is done correctly, gyro wheel speed is not subject to angular accelerations and decelerations. In summary, the first approach measures speed errors and the resultant error measurements are used to modify the gyro output data in an associated computer. The second approach modifies armature excitation frequency so as to compensate for movement of the gyro case whereby the resulting output data do not include errors and, thus, do not have to be modified.

One suggestion for implementing the first approach described above comprises distributing small permanent magnets about the periphery of the rotor. The magnets induce pulses in a coil attached to the stator (gyro case) as the rotor turns. The time between pulses is measured in a highly accurate manner and the measurements are used to provide an indication of the angular velocity of the rotor with respect to the gyro case. The angular velocity of the rotor with respect to its case is then summed in an associated computer with the angular velocity of the gyro case with respect to inertial space to yield the actual wheel speed with respect to inertial space.

The problem with the foregoing proposal is that it is difficult to implement in practice. First, complex, time consuming computations are required. Second, it is not practical to obtain sufficient resolution and accuracy from such a pulse generating system, without using a prohibitively large number of pins and an extremely fast timing clock (above 20 MHz). Reference is hereby made to U.S Patent Application, Ser. No. 861,898, filed Dec. 19, 1977, entitled "Gyroscope Wheel Speed Modulator" by Guy R. Olbrechts for a more a detailed discussion of the foregoing implementation of the first approach described above and the reasons why it is unsatisfactory in most environments.

One suggestion for implementing the second approach described above is set forth in U.S. Patent Application, Ser. No. 861,898 referenced above. In this approach, the frequency of the polyphase power applied to the gyro is modulated in such a way that the rotating flux wave is maintained precisely constant with respect to inertial space, regardless of the rotation of the gyro case. The polyphase power is modulated in direct proportion to the angular velocity of the case, as measured by a second gyro. The proper amount of frequency modulation is applied in the proper sense to cancel the effect of gyro case rotation. Since the resulting flux wave travels at a constant inertial velocity, the hunting mode of the gyro system is not excited, whereby no fluctuations in load angle occur. Since this proposal compensates for fluctuations in case movement, the resulting gyro rate information does not have to be modified, as noted above. Reference is hereby made to U.S. Patent Application, Ser. No. 861,898 for a more detailed discussion of this implementation.

While the implementation described in U.S. Patent Application, Ser. No. 861,898 has been found to be entirely satisfactory in eliminating the effect of case movement on the rotational speed of a gyro mass, it has certain disadvantages. For example, each gyro depends upon another gyro for the measurement of the angular velocity of the vehicle about the first gyro's spin axis. This interdependency of gyros is disadvantageous in a navigation system because if the sensing gyro fails the dependent gyro information is erroneous. Secondly, the gain of the signal produced by the sensing gyro must be closely controlled (to about ±2%) in order to achieve precise cancellation of the effect of case rotation about the spin axis of the dependent gyro. If the batch spread in scale factor of either the frequency source (which is described in U.S. Patent Application, Ser. No. 861,898 as preferably taking the form of a voltage controlled crystal oscillator) or the sensing gyro is greater than ±2%, a calibration procedure is required to determine the gain that must be applied to the signal produced by the sensing gyro. Third, while the system described in Patent Application, Ser. No. 861,898 may include a phase-locked loop, it is essentially a means of providing an open loop compensation for the effect of vehicle movement. The inclusion of a phase-locked loop only preserves the long-term frequency stability of the voltage controlled crystal oscillator. Because it is essentially open loop, this sytem does not actually modify the natural or hunting frequency mode of the gyro. As will be readily appreciated by those skilled in the gyro art, the damping of this mode is normally very low (Q ranges from 20 to 100). As a result, any small phase shifts in the incoming angular rate signal make it difficult, if not impossible, to exactly compensate by adjusting the gain applied to the signal produced by the sensing gyro alone. Further, random noise in the bearing system (including g-sensitive bearing drag) tends to excite the hunting mode such that the rotor perpetually oscillates back and forth through a small angle. Fourth, the open loop nature of the system described in U.S. Patent Application, Ser. No. 861,898 requires that the voltage controlled crystal oscillator have a very linear voltage-to-frequency characteristic. Any non-linearity causes imperfect cancellation of case rotation at related amplitude levels. Because commercially available voltage controlled crystal oscillators, when specified to have a non-linearity of less than 1%, generally exhibit large frequency variations with temperature, the system described in U.S. Patent Application, Ser. No. 861,898 requires the inclusion of a phase-locked loop. In other words, in order to temperature stabilize the center frequency and maintain desired linearity relationships using presently commercially available voltage controlled crystal oscillators, it is necessary to include a phase-locked loop. Obviously, it would be desirable to provide a system for controlling the wheel speed of a gyroscope that does not require the inclusion of a precisely linear voltage controlled crystal oscillator. Moreover, it would be desirable to provide a controller for controlling the wheel speed of a gyroscope that does not require the inclusion of a phase-locked loop.

In general, it is an object of this invention to provide a new and improved controller for controlling the rotor speed of a synchronous motor.

It is a further object of this invention to provide a new and improved gyroscope wheel speed controller.

It is also an object of this invention to provide a closed-loop speed controller suitable for controlling the wheel speed of a gyroscope.

It is another object of this invention to provide a closed-loop gyroscope wheel speed controller that does not depend upon measurements made by another instrument, such as another gyroscope.

It is yet another object of this invention to provide a closed-loop gyroscope wheel speed controller that does not require the inclusion of a phase-locked loop.

SUMMARY OF THE INVENTION

In accordance with this invention, a closed-loop controller for modulating the frequency of the power applied to a gyroscope synchronous motor so as to control the position of the synchronously rotating armature field and, thereby, maintain the speed of the rotor (wheel) of the gyro constant with respect to inertial space, despite movement of the gyro case about the spin axis of the gyro, is provided. The controller includes a sensor for sensing fluctuations in the current drawn by the gyro. These fluctuations are directly related to fluctuations in the load angle caused by movement of the gyro case about its spin axis. The current fluctuations create an analog voltage, which is amplified by several orders of magnitude. The result is used to modulate the frequency of the applied power so as to compensate for the load angle fluctuations caused by case movement about the spin axis. In essence, the controller and gyro become parts of a closed-loop system and reduce the frequency of the hunting mode of the gyro to a level below which movement of the gyro case about its spin axis has no undesirable effect. In addition, preferably, the controller phase shifts the feedback modulation signals so as to damp hunting excursions near the lowered hunting mode frequency. Finally, noise signals, particularly noise signals at the motor excitation frequency, are filtered out to prevent such signals from saturating the feedback electronics.

In one specific form, a voltage sensitive oscillator such as a voltage controlled crystal oscillator has its output frequency modulated over a small range by the amplified feedback signal. The output of the voltage controlled crystal oscillator is divided down to a suitable frequency level and the result used to control the frequency of the power applied to the gyro.

In an alternative implementation, the feedback signal controls the frequency of narrow pulses produced by a unipolar voltage-to-frequency converter. The narrow, relatively low frequency pulses produced by the voltage-to-frequency converter are summed with relatively high frequency pulses produced by a stable fixed-frequency source. In other words, the low frequency pulses are added to the higher frequency pulses produced by the stable frequency source. The combined pulse train is divided down to a suitable frequency level and the result used to control the frequency of the power applied to the gyro.

It will be appreciated from the foregoing brief summary that the invention provides a closed-loop controller for controlling the wheel speed of a gyroscope in a manner that compensates for movement of the gyro case about the spin axis of the gyro. Because the invention is closed-loop, it does not require the use of a separate sensor for sensing motion of the gyro case about its spin axis as required by the invention described in U.S. Patent Application, Ser. No. 861,898, referenced above. Further, the present invention can be implemented in a manner that does not require the inclusion of the phase-locked loop, which was an essential element of the invention described in U.S. Patent Application Ser. No. 861,898. Moreover, because the voltage controlled crystal oscillator (or other controlled frequency source) is now part of a closed-loop controller, precise voltage/frequency linearity is not required. As a result, commercially available voltage controlled crystal oscillators with very stable center frequencies can be used, without requiring that they form part of a separate phase-locked loop.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Prior to describing the preferred embodiments of the invention, a brief discussion of the operation of a gyro synchronous motor is set forth. As with any synchronous motor, the natural frequency of a gyro motor is a function of the moment of inertia, J, of the rotor and the electrical spring-constant, K, resulting from the attraction of the DC rotor field to the armature's rotating field. When disturbed by a torque, an angular displacement, $\phi$, develops between the rotor DC field and the armature field according to the equation:

$$J\frac{d^2\phi}{dt^2} + D\frac{d\phi}{dt} + K\phi = T(t) \tag{1}$$

where:

T (t) is the torque applied to the rotor; and,

D is the viscous damping factor producing by eddy-current and windage losses. (The viscous damping factor D is usually very small in gyros.)

The two roots of equation (1) describe the hunting mode whose natural frequency is given by $\sqrt{K/J}$. The angle $\phi$ is generally referred to as the load angle.

Figure 2:
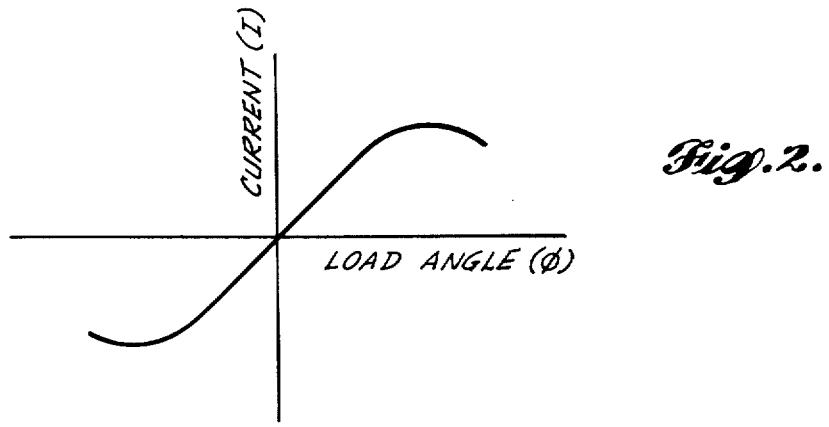
FIG. 2 is a wave-form diagram showing the relationship between load angle and the current drawn by a three-phase synchronous motor.

A characteristic of a synchronous motor is that a direct proportionality exists between the sine of the load angle, $\phi$, and the armature (stator) current, I, as illustrated in FIG. 2. This characteristic follows from conservation of energy considerations. As a result, for small load angle fluctuations, fluctuations in armature current are directly related to fluctuations in load angle. (As discussed above, fluctuations in load angle occur when the case of the gyro is moved about its spin axis.) Consequently, sensing armature current fluctuations provides a direct measurement of load angle fluctuations, when load angle fluctuations are small.

In accordance with this invention, armature current fluctuations are used to modulate the frequency of the power applied to the gyro in a feedback manner. The feedback modulation is applied in a manner such that closed-loop gyro stiffness is made very small. Since gyro stiffness is made very small, the gyro wheel, essentially, is inertially free, whereby it is unperturbed in angular velocity by motions of the gyro case. While it would be desirable to make gyro stiffness vanish entirely, this result is impossible to achieve due to practical limitations on feedback gain. On the other hand, gyro stiffness can be reduced to a point where the hunting mode or natural frequency, $\sqrt{K/J}$, is such that normal (aircraft) vibration produces no undesirable effects. This is possible because aircraft angular rate amplitudes are low at very low frequencies (below 1.0 Hertz). As will be better understood by the following discussion, in addition to the advantage of reducing the hunting mode frequency to a level at which vibration produces no undesirable effects, a gyroscope closed-loop speed controller formed in accordance with the invention also has the advantage that it can heavily damp hunting mode excursions by filtering the feedback modulation signal.

Turning now to a discussion of the theory of operation of the invention, movement of a gyro case about the gyro spin axis causes no spurious torque acting on the rotor, which can be represented on the right-hand side of equation (1). As a result, considering only the effect of case movement on the gyro, equation (1) can be rewritten as:

$$J \frac{d^2\phi}{dt^2} + D \frac{d\phi}{dt} + K\phi = 0 \quad (2)$$

Figure 1:
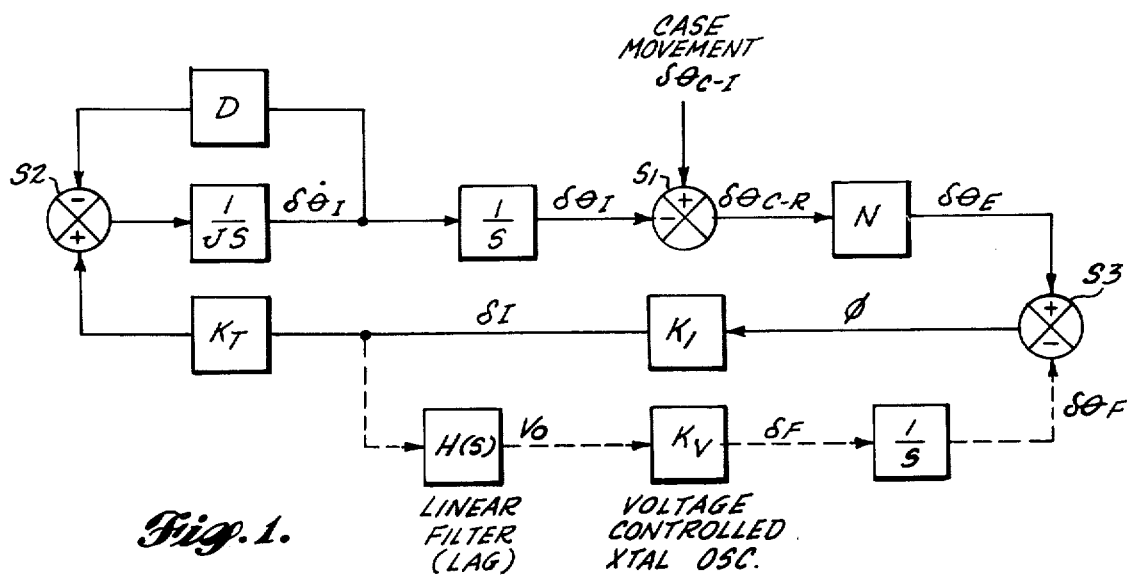
FIG. 1 is a schematic block diagram of a gyro, including a closed-loop speed controlled (shown by the blocks connected by the dashed lines), formed in accordance with the invention.

The foregoing equation is derived directly from the gyro model illustrated in FIG. 1, where K equals $NK_1K_T$, and $\delta\theta_{C-I}$ equals zero. (At this time the feedback path, connected by the dashed lines in FIG. 1, is not being considered, whereby $\delta\theta_F$ is also equal to zero.) N, of course, equals the number of pole pairs, $K_1$ is the load angle/current constant of proportionality and $K_T$ is the current/torque constant of the motor.

Equation (2) can be rewritten in Laplacian notation as:

$$Js^2\phi + Ds\phi + K\phi = 0 \quad (3)$$

which can be revised to read:

$$(s^2 + 2\xi\omega s + \omega^2)\phi = 0 \quad (4)$$

where:
$\omega = \sqrt{K/J}$, the natural frequency of the hunting mode; and,
$\xi = D/2\omega J$, the damping coefficient.

Ignoring still the feedback path, the constant $K_1$ has an open loop value of $\delta I/\phi$ or $\delta I/\delta\theta_E$. Under closed loop conditions $K_1$ is dynamically modified to the transfer function:

$$K_1(s) = \frac{\delta I(s)}{\delta\theta_E(s)} \quad (5)$$

When the feedback path is considered, the constant $K_1$ has an open loop value of:

$$K_1 = \frac{\delta I}{\delta\theta_E - \delta\theta_F} \quad (6)$$

which can be written in terms of $\delta I$ as:

$$\delta I = K_1 (\delta\theta_E - \delta\theta_F) \quad (7)$$

since $$\delta\theta_F = \frac{K_V H(s)}{s} \delta I. \quad (7A)$$

equation 7 can be rewritten as:

$$\delta I = K_1(\delta\theta_E - \frac{K_V H(s)}{s} \delta I) \quad (8)$$

which can be rearranged to read:

$$\delta I + \frac{K_1 K_V H(s)}{s} \delta I = K_1 \delta\theta_E \quad (9)$$

or $$\delta I (1 + \frac{K_1 K_V H(s)}{s}) = K_1 \delta\theta_E \quad (10)$$

Equation (10) can be rearranged to read:

$$\frac{\delta I(s)}{\delta\theta_E(s)} = \frac{K_1}{1 + \frac{K_1 K_V H(s)}{s}} \quad (11)$$

which can be rewritten as:

$$\frac{\delta I(s)}{\delta\theta_E(s)} = \frac{K_1 s}{s + K_1 K_V H(s)} \quad (12)$$

If H(s) is a perfect differentiator, H·s, equation (12) reduces to:

$$\frac{\delta I}{\delta\theta_E} = \frac{K_1}{1 + K_1 K_V H} \quad (13)$$

Equation (13) shows that $\delta I/\delta\theta_E$ is reduced in value by the feedback. Accordingly the gyro "stiffness" is reduced.

If $K_1 K_V H >> 1$, equation (13) becomes $$\frac{\delta I}{\delta\theta_E} \approx \frac{1}{K_V H} \quad (14)$$

Figure 3:
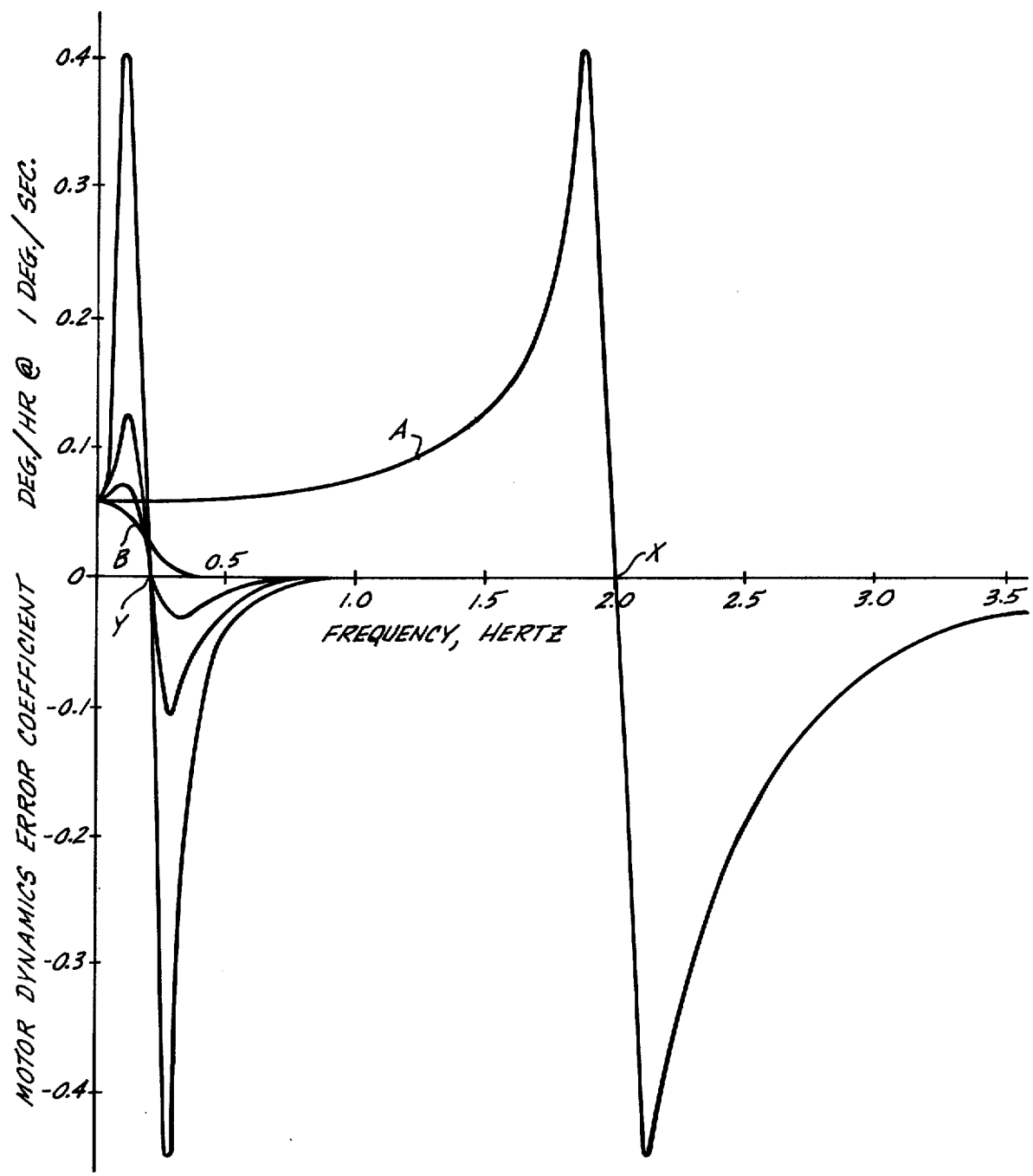
FIG. 3 is a typical curve showing motor dynamic error versus frequency for a 1°/second (zero-to-peak) oscillatory input on both the spin and input axes of a gyroscope and how the gyroscope system is modified by including a closed-loop speed controller formed in accordance with the invention.

The effect of this feedback is to reduce the resonant frequency of the hunting mode without changing the damping coefficient, $\xi$. Since the inherent damping of the gyro motor, D, is already negligible, it can be ignored. In essence this means that the motor dynamics error coefficient curve, shown pictorially in FIG. 3 as curve A, is shifted from a position about point X to a position about point Y. In other words, the gyro, which now includes a gyro motor and a closed-loop feedback controller, now has a lower hunting mode frequency (about approximately 0.2 Hz as compared to about approximately 2.0 Hz in the example shown in FIG. 3).

If, rather than attempting to make H(s) a perfect differentiator, H·s, H(s) takes the form:

$$H(s) = \frac{Hs}{Hs + 1} \quad (15)$$

damping can be increased. More specifically, substituting equation (15) into equation (12) results in:

$$\frac{\delta I(s)}{\delta \theta_E(s)} = \frac{K_1 s}{s + \frac{K_1 K_v H s}{H s + 1}} \quad (16)$$

which can be rearranged to:

$$\frac{\delta I(s)}{\delta \theta_E(s)} = \frac{K_1 s (H s + 1)}{H s^2 + s + K_1 K_v H s} \quad (17)$$

which can be reduced to:

$$\frac{\delta I(s)}{\delta \theta_E(s)} = \frac{K_1 (H s + 1)}{H s + 1 + K_1 K_v H} \quad (18)$$

Now, if $K_1 K_v H >> H s + 1$ equation (18) becomes $$\frac{\delta I(s)}{\delta \theta_E(s)} \approx \frac{s}{K_v} + \frac{1}{K_v H} \quad (19)$$

Equation (19) is the same as equation (14), with the addition of a rate term. The rate term increases the damping of the hunting mode. Depending on the values chosen, the motor dynamics error coefficient (FIG. 3) about point Y can be greatly reduced, as represented by curve B.

The fact that the addition of a rate term increases the damping mode can be easily demonstrated mathematically by recalculating the characteristic equation using equation (19) rather than equation (14). In any event, the closed loop resonant frequency ($\omega$) and the damping coefficient ($\xi$) are determined by the values of the components used to form the H(s) and $K_v$ subsystems.

Figure 4:
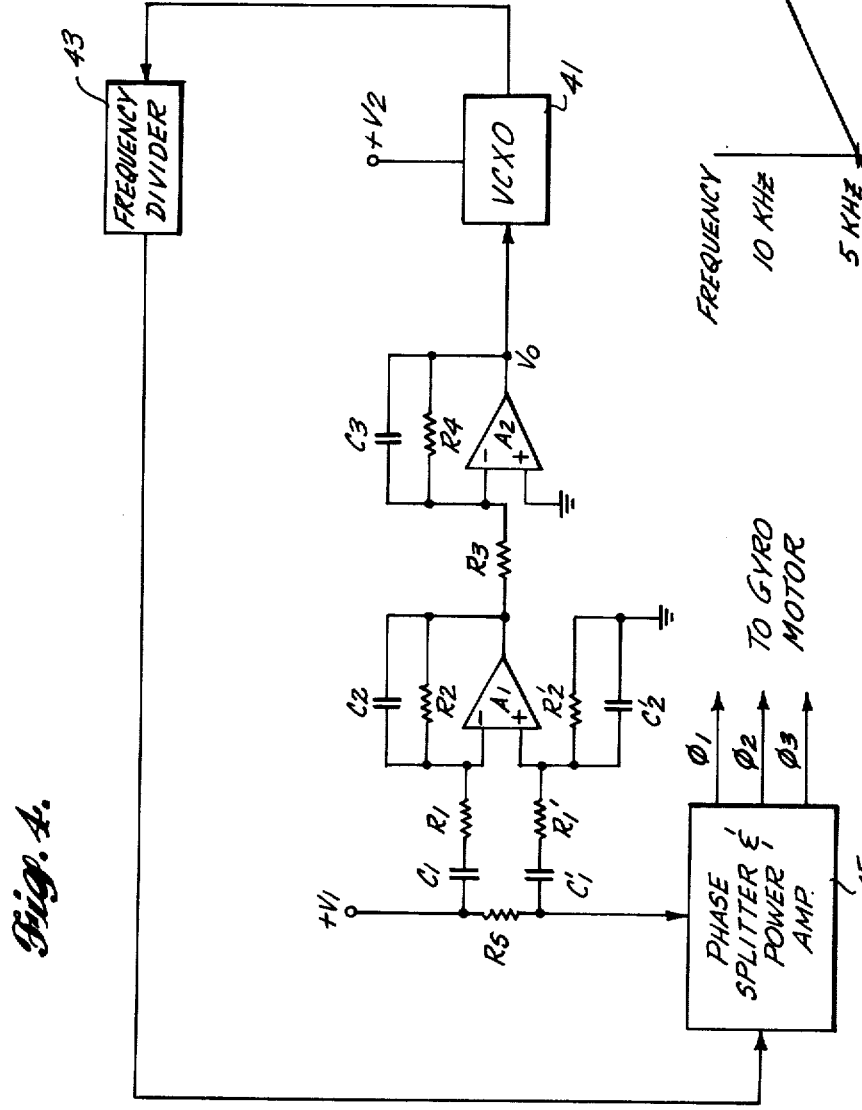
FIG. 4 is a partially block and partially schematic diagram of a preferred embodiment of a closed-loop speed controller formed in accordance with the invention.

FIG. 4 is a schematic diagram of a gyroscope closed-loop controller formed in accordance with the invention for modulating the frequency of the power applied to a gyro motor. The controller illustrated in FIG. 4 comprises: two operational amplifiers designed A1 and A2; a current sensing resistor designated $R_s$; six resistors designated $R_1$, $R'_1$, $R_2$, $R'_2$, $R_3$ and $R_4$; five capacitors designated $C_1$, $C'_1$, $C_2$, $C'_2$ and $C_3$; a voltage controlled crystal oscillator (VCXO) 41; and, a frequency divider 43. Also illustrated in FIG. 4 is a phase splitter and power amplifier 45.

$R_s$ is connected between a DC power supply designated +V1 and the power input of the phase splitter and power amplifier 45. The junction between +V1 and $R_s$ is connected through a series circuit comprising $C_1$ and $R_1$ to the inverting input of A1. The junction between $R_s$ and the phase splitter and power amplifier is connected through a series circuit comprising $C'_1$ and $R'_1$ to the noninverting input of A1. $C_2$ and $R_2$ are connected in parallel between the output of A1 and the inverting input of A1. $C'_2$ and $R'_2$ are connected in parallel between the noninverting input of A1 and ground.

The output of A1 is connected through $R_3$ to the inverting input of A2. The noninverting input of A2 is connected to ground. $R_4$ and $C_3$ are connected in parallel between the output of A2 and the inverting input of A2. The analog voltage output of A2 is the $V_o$ voltage applied to the voltage controlled crystal oscillator (VCXO), discussed above with respect to FIG. 1. Thus, the output of A2 is connected to the voltage control input of the VCXO. The VCXO receives DC power from a suitable power supply designated +V2. The output of the VCXO is connected to the input of the frequency divider; and, the output of the frequency divider is connected to the frequency control input of the phase splitter and power amplifier 45. The phase splitter and power amplifier, in a conventional manner, produces a three phase output, which is applied to the gyro motor. The phase splitter and power amplifier may split a nominal 2400 Hz control signal into three-phase 400 Hz power, for example.

A1, A2 and their related resistors and capacitors, plus $R_s$, implement H(s). The voltage drop across $R_s$ is directly proportional to the mean armature current in the gyro motor, assuming that the power amplifier forming part of the phase splitter and power amplifier 45 is a constant efficiency power amplifier. Further, the values of $R_1$ and $R'_1$; $R_2$ and $R'_2$; $C_1$ and $C'_1$; and, $C_2$ and $C'_2$ are the same. As a result of the connection of similar circuitry to both the inverting and noninverting inputs of A1, common mode effects are minimized. Since the two inputs to A1 are capacitively coupled through $C_1$ and $C'_1$; only fluctuations in the current passing through $R_s$ are sensed.

The feedback impedance around A1, $Z_2$, is formed by $C_2$ and $R_2$ and is given by:

$$Z_2 = \frac{R_2}{1 + s R_2 C_2} \quad (20)$$

The A1 transfer function, $A_1(s)$, is given by $$A_1(s) = \frac{Z_2}{Z_1} = \frac{\frac{R_2}{1 + s R_2 C_2}}{R_1 + \frac{1}{s C_1}} \quad (21)$$

where $$Z_1 = R_1 + \frac{1}{s C_1}$$

Equation (21) can be simplified to read:

$$A_1(s) = \frac{s R_2 C_1}{(1 + s R_2 C_2)(1 + s R_1 C_1)} \quad (22)$$

The value of $R_1$ is chosen to be low, whereby the $(1 + s R_1 C_1)$ root only has an effect at high frequencies. (It is included to reduce the effects of high frequency noise.) Since the hunting mode frequency is relatively low, this high frequency root can be ignored. That is, this root can be ignored when calculating the low frequency response of the gyro.

A2 and its related circuit components ($R_3$, $R_4$ and $C_3$) form a simple voltage amplifier with a high frequency roll-off that further improves the noise immunity of the feedback circuit. The high frequency roll-off is controlled by the value of $C_3$. Thus, $C_3$ can be ignored when calculating the low frequency gain of A2. Hence, the low frequency gain of A2 is equal to $R_4/R_3$.

As noted above $R_s$ and the amplifiers A1 and A2 (plus their R and C circuit components) form H(s). More specifically, from FIG. 1:

$$H(s) = \frac{V_o(s)}{\delta I(s)} \quad (23)$$

From FIG. 4:

$$H(s) = R_s A_1(s) A_2(s) \quad (24)$$

As discussed above, at low frequency $A_1(s)$ is described by equation (22); and, $A_2(s)$ equals $R_4/R_3$. Therefore equation (24) can be rewritten:

$$H(s) = R_s \cdot \frac{sR_2C_1}{(1 + sR_2C_2)} \cdot \frac{R_4}{R_3} \quad (25)$$

The output of A2, which is $V_o$, is applied to the input of the VCXO 41. The gain of the VCXO is known, and may be described in terms of Hertz/volt. The $K_v$ gain (FIG. 1) is the gain of the VCXO 41 (adjusted by the division factor of the frequency divider 43) and is expressed in terms of electrical degree/second/volt.

In order to calculate the closed-loop response of the gyro system, in addition to the R and C value information, and the divider adjusted gain of the VCXO, the $\delta I/\phi$ ratio of the gyro motor must be known. As is well known to those skilled in the synchronous motor art, $\delta I/\phi$ ratios can be measured. In the present calculations the measurement need not be of high precision, a 10–20% error being acceptable. If desired, the value can be obtained theoretically, as well as experimentally.

Finally the $K_T/J$ ratio must be determined. This ratio can be calculated directly from the unaugmented hunting mode frequency, $\omega$, of the motor. More specifically, $\omega^2 = K/J$ (from the definition following equation 4). Since $K = K_1 K_T N$:

$$\frac{K_T}{J} = \frac{\omega^2}{K_1 N} \quad (26)$$

Since $\omega^2$, $K_1$ and $N$ are measurable or calculatable, $K_T/J$ can be readily determined.

At this point it will be appreciated that all of the information necessary to determine the resonant frequency and the damping ratio as a function of the value of the R and C elements for a specific gyro motor have been shown to be either known or readily determinable.

Turning now to discussion of a specific example of an actual gyro, including a closed-loop speed controller of the type illustrated in FIG. 4. In this example, the R/C values were chosen to be:

$R_s = 20$ ohms
$R_2 = 2.0$ Mohms
$R_3 = 10$ Kohms
$R_4 = 1.0$ Mohms
$C_1 = 4.7$ μF
$C_2 = 0.47$ μF Based on equation (25), H(s) in volts/amp is:

$$H(s) = 20 \cdot \frac{s(2 \times 10^6)(4.7 \times 10^{-6})}{[1 + s(2 \times 10^6)(0.47 \times 10^{-6})]} \cdot \frac{10^6}{10^4} \quad (27)$$

which, in volts/milliamp, equals:

$$H(s) = \frac{18.8s}{1 + 0.94s} \quad (28)$$

In this example the $K_v$ value of the VCXO/divider arrangement was 9.3 electrical degrees/second/volt, at 400 Hz; the $K_1$ value of the gyro motor was 0.61 milliamps/electrical degree; and, the unaugmented hunting mode or resonant frequency (f) of the gyro motor was 1.95 Hz. Since $\omega = 2\pi f$, $\omega$ was equal to 12.2 radians/second for this gyro motor. Based on this data, from equation (26), $K_T/J$ is equal to $12.2^2/(0.64)(4)$, which equals 61 degrees/sec²/milliamp.

In order to calculate the closed loop response of the transfer function $\delta\theta_f(s)/\delta\theta_{C-f}(s)$, which is the response of the gyro wheel to an angular disturbance of the case about the gyro spin axis, the $\delta I(s)/\delta\theta_E(s)$ response must first be calculated using equation (12). Specifically:

$$\frac{\delta I(s)}{\delta\theta_E(s)} = \frac{K_1 s}{s + K_1 K_v H(s)} \quad (29)$$

when the foregoing values are inserted for $K_1$, $K_v$ and H(s), equation (29) becomes:

$$\frac{\delta I(s)}{\delta\theta_E(s)} = \frac{0.61s}{s + (0.61 \times 9.3 \times \frac{18.8s}{1 + 0.94s})} \quad (30)$$

which reduces to $$\frac{\delta I(s)}{\delta\theta_E(s)} = \frac{0.0056(0.94s + 1)}{(0.0087s + 1)} \quad (31)$$

Which further reduces to $$\frac{\delta I(s)}{\delta\theta_E(s)} = 0.0056(0.94s + 1) \quad (32)$$

which is in terms of milliamps/electrical degree.

Turning now to the $\delta\theta_f(s)/\delta\theta_{C-f}(s)$ calculation, from FIG. 1, by inspection:

$$\delta\theta_f(s) = \frac{K_T}{Js^2} \cdot \frac{\delta I(s)}{\delta\theta_E(s)} \cdot N(\delta\theta_{C-I} - \delta\theta_f) \quad (33)$$

Equation (33) can be rearranged to the form:

$$\frac{\delta\theta_f(s)}{\delta\theta_{C-f}(s)} = \frac{N \cdot \frac{\delta I(s)}{\delta\theta_E(s)} \cdot \frac{K_T}{Js^2}}{1 + N \cdot \frac{\delta I(s)}{\delta\theta_E(s)} \cdot \frac{K_T}{Js^2}} \quad (34)$$

Using the numerical values set forth or derived above, and a value of four (4) pole-pairs for N, equation (34) becomes:

$$\frac{\delta\theta_f(s)}{\delta\theta_{C-f}(s)} = \frac{4 \cdot 0.00056(0.94s + 1) \cdot \frac{61}{s^2}}{1 + [4 \cdot 0.0056(0.94s + 1) \cdot \frac{61}{s^2}]} \quad (35)$$

Multiplying top and bottom by $s^2$ and performing the required numerical multiplications reduces equation (35) to:

$$\frac{\delta\theta_f(s)}{\delta\theta_{C-f}(s)} = \frac{1.28s + 1.36}{s^2 + 1.28s + 1.36} \quad (36)$$

Equation (36) is in the form $$\frac{2\xi_c \omega_c s + \omega_c^2}{s^2 + 2\xi_c \omega_c s + \omega_c^2} \quad (37)$$

whereby the closed loop resonant frequency, $\omega_c$, equals $\sqrt{1.36}$ radians/second or $f_c = \omega_c/2\pi = 0.19$ Hz. The closed loop damping coefficient, $\xi_c$, equals 0.55.

The foregoing calculations show that a ten-to-one reduction in natural frequency can be expected. More specifically, the natural frequency of the gyro has been reduced by the closed-loop speed controller from 1.95 Hz to 0.19 Hz. Moreover, the damping coefficient has been increased toward the critical damping value of 1.0. When this actual embodiment of the invention was tested, no stability problems were encountered. Moreover, there was no tendency for the gyro to "slip poles" even when the gyro mount was oscillated vigorously about the spin axis. In the actual embodiment, the natural frequency was found to have been reduced to about 0.25 Hz, a little higher than the calculated value of 0.19 Hz; but, still lower than the natural frequency of the gyro motor alone by about eight-to-one. The damping coefficient was found to be around 0.5.

Figure 5:
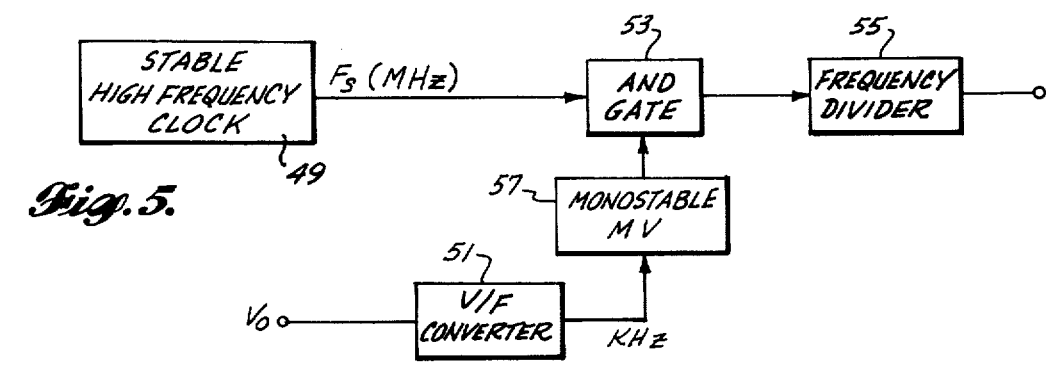
FIG. 5 is a block diagram of a portion of an alternative embodiment of a closed-loop speed controller formed in accordance with the invention; and, FIG. 6 is a graph of output frequency as a function of applied voltage for a typical, low-cost, unipolar voltage-to-frequency converter.

FIG. 5 illustrates an alternate embodiment of a closed-loop speed controller formed in accordance with the invention. Rather than using sensed current fluctuations to control the frequency of a signal produced by a voltage controlled crystal oscillator and, using this signal to control the frequency of the power applied to the gyro, the embodiment illustrated in FIG. 5 uses the sensed current fluctuations (after conversion to analog voltage form) to control the frequency of a signal produced by an inexpensive, single-chip unipolar voltage-to-frequency (V/F) converter. The output of the V/F converter is asynchronously combined with a stable high frequency reference clock signal. The resultant combined signal is frequency divided and the result of the division is used to control the frequency of the power applied to the gyro by the phase splitter and power amplifier.

Figure 6:
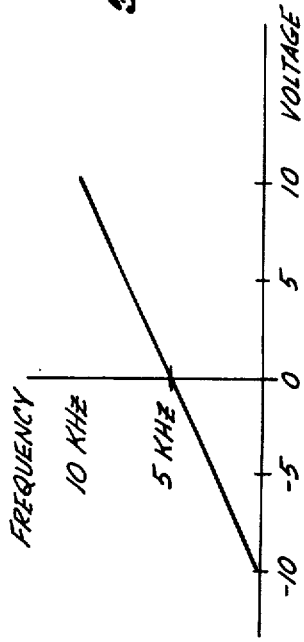

More specifically, FIG. 5 illustrates a gyroscope closed-loop speed controller that includes: a stable high frequency clock (e.g., 1 mHz); a low frequency (e.g., 10 KHz range) unipolar V/F converter 51; an AND gate 53; a frequency divider 55; and, a monostable multivibrator 57. The output of the high frequency clock is a pulse train (10-20% duty cycle) of frequency $F_S$. The $F_S$ pulse train is applied to one input of the AND gate 53. The feedback voltage $V_O$, which is an analog signal whose level is related to the level of the fluctuations in the armature current applied to the gyro motor, as previously discussed with respect to FIG. 5, is applied to the voltage control input of the V/F converter 51. The V/F converter produces a square wave output at a frequency related to the value of $V_0$. An example of the frequency vs. voltage characteristic of a unipolar V/F converter is shown in FIG. 6. The output of the V/F converter is applied to the monostable multivibrator 57 to obtain a pulse train of low duty cycle. That is, the monostable multivibrator 57 produces a pulse on one of the edges (leading or trailing) of each V/F converter square wave. The duration or duty cycle time of these pulses is comparable to that of the pulses produced by the stable high frequency clock 49. The output of the monostable multivibrator 57 is applied to the second input of the AND gate 53.

As noted above, the duty cycle of the $F_S$ signal preferably falls in the 10-20 percent range. And, the duration time of the pulses produced by the monostable multivibrator 57 fall in a corresponding range. Thus, if the pulse width of the $F_S$ signal is ten (10) nanoseconds, approximately ten (10) nanosecond pulses are produced by the monostable multivibrator at the frequency of the output of the V/F converter 51. As noted above, the pulses produced by the monostable multivibrator are asynchronous with respect to $F_S$. Consequently, while some pulse overlaps do occur, because of the 10-20% duty cycle, the majority of the pulses do not overlap. (Overlaps, of course, produce only one AND gate output pulse, rather than two.) The loss of pulses due to overlapping is random since the two pulse trains are asynchronous. The percentage loss is statistically related to the duty cycle of the $F_s$ signal and, therefore, is determinable. The mean or average percentage loss is, thus, known and easily compensated for by a corresponding increase in the voltage gain of the V/F converter.

The output of the AND gate 53 is applied to the frequency divider 55, which divides the frequency of the combined pulse chain down to a level suitable for controlling the frequency of the power applied to the gyro by the phase splitter and power amplifier. The nominal output of the divider 55 may be 2,400 Hz, for example, which is readily used by the phase splitter and power amplifier to produce a gyro power signal having a frequency of 400 Hz, nominal value, for example.

It is to be understood that FIG. 5 only illustrates a portion of a closed-loop speed controller formed in accordance with the invention. In addition to the portion illustrated in FIG. 5, the complete controller would also include amplifiers similar to A1 and A2 and the related R/C components; or equivalent circuitry. Thus, the composite closed-loop speed controller will amplify the speed related analog voltage by several orders of magnitude; and, phase shift the control signal $V_O$, as previously discussed with respect to FIGS. 1–5.

It will be appreciated that a gyroscope closed-loop speed controller of the type illustrated in FIG. 5 can be formed in a relatively inexpensive manner. While the stability of the $F_S$ source is critical, the actual frequency is not critical. That is, it is necessary that the $F_S$ source be stable at some frequency, but the actual frequency value is not critical. Moreover, the V/F converter can be a relatively inexpensive component since its output frequency is low and asynchronous. Further, a monostable multivibrator that produces pulses in the ten (10) nanosecond range is relatively inexpensive. As a result, the portion of the closed-loop speed controller illustrated in FIG. 5 is relatively inexpensive.

It will be appreciated from the foregoing description that the invention provides an uncomplicated controller for controlling the frequency of power applied to a gyroscope motor. The invention overcomes the disadvantages of prior art gyro speed controllers, such as the one disclosed in U.S. patent application, Ser. No. 861,898, referenced above. More specifically, the controller of the invention does not require that information about the movement of the gyro case about its spin axis be derived from an external source, e.g., a second gyro. Thus, gyro interdependency is avoided using the invention. Moreover, a phase-locked loop is not required, even though one can be used in conjunction with either the FIG. 4 or FIG. 5 embodiments of the invention to control the frequency of the signal produced by the VXCO or V/F converter, as the case may be. Finally, because of the closed loop nature of the invention, neither the VXCO nor alternatively the V/F converter, as the case may be, is required to have an extremely linear voltage-to-frequency characteristic.

While preferred embodiments of the invention have been illustrated and described, it will be appreciated that various changes can be made therein without departing from the spirit and scope of the invention.

Hence, the invention can be practiced otherwise than as specifically described herein.

The embodiments of the invention in which an exclusive property or privilege is claimed are defined as follows:

1. A gyroscope comprising:
   a multiphase synchronous gyroscope motor including armature windings for receiving power from a suitable multiphase gyroscope power source and rotating the wheel of said gyroscope at a speed related to the frequency of the power received from said multiphase gyroscope power source;
   a multiphase gyroscope power source, connected to said synchronous gyroscope motor, for: drawing power from a power supply; receiving a frequency control signal from a suitable control source; and, producing multiphase AC power having a frequency controlled by said frequency control signal; and
   a closed-loop speed controller for: sensing the power drawn by said multiphase gyroscope power source from said power supply, including fluctuations in said drawn power; producing a frequency control signal that fluctuates in accordance with said fluctuations in said drawn power; and, applying said frequency control signal to said multiphase gyroscope power source to control the frequency of the multiphase AC power produced by said multiphase gyroscope power source.

2. A gyroscope as claimed in claim 1 wherein said closed-loop speed controller amplifies said fluctuations in said drawn power by several orders of magnitude.

3. A gyroscope as claimed in claim 2 wherein said frequency control signal fluctuations lag said fluctuations in said drawn power.

4. A gyroscope comprising:
   (A) a synchronous gyroscope motor including armature windings for receiving power from a suitable gyroscope power source and rotating the wheel of said gyroscope at a speed related to the frequency of the power received from said gyroscope power source;
   (B) a gyroscope power source, connected to said synchronous gyroscope motor, for: drawing power from a suitable power supply; receiving a speed control signal from a closed-loop speed controller; and, producing AC power having a frequency controlled by said speed control signal; and,
   (C) a closed-loop speed controller comprising:
      (1) sensing means for sensing the power drawn by said gyroscope power source from said power supply, including fluctuations in said drawn power, and producing a frequency control signal that fluctuates in accordance with said fluctuations in said drawn power;
      (2) linear filter means connected to said sensing means for receiving said frequency control signal producing an amplified, phase shifted voltage control signal in accordance therewith; and,
      (3) control signal means connected to said linear filter means for receiving said amplified, phase shifted voltage control signal and producing in accordance therewith a speed control signal having a frequency related to the instantaneous amplitude of said amplified, phase shifted voltage control signal, said speed control signal being applied to said gyroscope power source to control the frequency of the AC power produced by said gyroscope power source.

5. A gyroscope as claimed in claim 4 wherein said amplified, phase shifted voltage control signal produced by said linear filter means lags said signal produced by said sensing means related to the fluctuations in the power drawn by said gyroscope power source.

6. A gyroscope as claimed in claim 5 wherein said amplified, phase shifted voltage control signal produced by said linear filter means is an analog signal whose voltage amplitude is related to said fluctuations in the power drawn by said gyroscope power source and whose phase lags said fluctuations in the power drawn by said gyroscope power source.

7. A gyroscope as claimed in claim 6 wherein said control signal means comprises a voltage controlled crystal oscillator.

8. A gyroscope as claimed in claim 6 wherein said control signal means comprises:
   a stable signal source for producing a relatively high frequency train of pulses at a stable frequency;
   a voltage-to-frequency converter connected to said linear filter means for producing pulses at a frequency related to the instantaneous amplitude of said amplified, phase shifted voltage control signal, but at a frequency substantially lower than the frequency of the pulses produced by said stable signal source; and,
   combining means for combining the signals produced by said voltage-to-frequency converter with the pulses produced by said stable signal source.

9. A gyroscope as claimed in claim 6 wherein said linear filter means includes a linear lag filter including an amplifier and having the low frequency transfer function $$\frac{sR_2C_1}{1 + sR_2C_2}$$

wherein:
   s is the Laplace operator;
   $C_1$ is the value of a capacitor coupling said sensing means to the input of said amplifier; and,
   $R_2$ and $C_2$ are the resistance and capacitance values respectively of a parallel R/C feedback circuit connecting the output of said amplifier to the input of said amplifier.

10. A gyroscope as claimed in claim 9 wherein said linear filter means also includes a linear amplification circuit connected between the output of said linear lag filter and the input of said control signal means, said linear amplification circuit including an amplifier and having the low frequency transfer function $R_4/R_3$ wherein $R_3$ is the value of a resistor connecting the output of said linear lag filter means to the input of said amplifier of said linear amplification circuit and $R_4$ is the resistance value of a resistor connecting the output of said amplifier of said linear amplification circuit to the input of said amplifier of said linear amplification circuit.

11. A gyroscope as claimed in claim 10 wherein said control signal means comprises a voltage controlled crystal oscillator.

12. A gyroscope as claimed in claim 10 wherein said control signal means comprises:
   a stable signal source for producing a relatively high frequency train of pulses at a stable frequency;

a voltage-to-frequency converter connected to said linear amplification circuit for producing pulses at a frequency related to the instantaneous amplitude of said amplified, phase shifted voltage control signal, but at a frequency substantially lower than the frequency of the pulses produced by said stable signal source; and, combining means for combining the signals produced by said voltage-to-frequency converter with the pulses produced by said stable signal source.

13. A gyroscope as claimed in claim 6 wherein said sensing means is a resistor.

14. A closed-loop speed controller for producing a speed control signal suitable for controlling the frequency of the power applied to a synchronous motor of the type used in a gyroscope such that the speed of the rotating element of said synchronous motor is maintained constant with respect to inertial space, said controller comprising:

sensing means for sensing fluctuations in the power applied to said synchronous motor and producing a signal related thereto;

linear filter means connected to said sensing means for receiving said signal related to said fluctuations in the power applied to said synchronous motor and producing an amplified, phase shifted voltage control signal in accordance therewith; and, control signal means connected to said linear filter means for receiving said amplified, phase shifted voltage control signal and producing in accordance therewith a speed control signal having a frequency related to the instantaneous amplitude of said amplified, phase shifted voltage control signal.

15. A closed-loop speed controller as claimed in claim 14 wherein said amplified, phase shifted voltage control signal produced by said linear filter means lags said signal produced by said sensing means related to the fluctuations in the power applied to said synchronous motor.

16. A closed-loop speed controller as claimed in claim 15 wherein said amplified, phase shifted voltage control signal produced by said linear filter means is an analog signal whose amplitude is related to said fluctuations in the power applied to said synchronous motor and whose phase lags said fluctuations in the power applied to said synchronous motor.

17. A closed-loop speed controller as claimed in claim 16 wherein said control signal means comprises a voltage controlled crystal oscillator.

18. A closed-loop speed controller as claimed in claim 16 wherein said control signal means comprises:

a stable signal source for producing a relatively high frequency train of pulses at a stable frequency;

a voltage-to-frequency converter connected to said linear filter means for producing pulses at a frequency related to the instantaneous amplitude of said amplified, phase shifted voltage control signal, but at a frequency substantially lower than the frequency of the pulses produced by said stable signal source; and, combining means for combining the signals produced by said voltage-to-frequency converter with the pulses produced by said stable signal source.

19. A closed loop speed controller as claimed in claim 16 wherein said linear filter means includes a linear lag filter including an amplifier and having the low frequency transfer function $$\frac{sR_2C_1}{1 + sR_2C_2}$$

wherein:

s is the Laplace operator;

$C_1$ is the value of the capacitor coupling said sensing means to the input of said amplifier; and, $R_2$ and $C_2$ are the resistance and capacitance values respectively, of a parallel R/C feedback circuit connecting the output of said amplifier to the input of said amplifier.

20. A closed-loop speed controller as claimed in claim 19 wherein said linear filter means also includes a linear amplification circuit connected between the output of said linear lag filter and the input of said control signal means, said linear amplification circuit including an amplifier and having the low frequency transfer function $R_4/R_3$ wherein $R_3$ is the value of a resistor connecting the output of said linear lag filter means to the input of said amplifier of said linear amplification circuit and $R_4$ is the resistance value of a resistor connecting the output of said amplifier of said linear amplification circuit to the input of said amplifier of said linear amplification circuit.

21. A closed-loop speed controller as claimed in claim 20 wherein said control signal means comprises a voltage controlled crystal oscillator.

22. A closed-loop speed controller as claimed in claim 20 wherein said control signal means comprises:

a stable signal source for producing a relatively high frequency train of pulses at a stable frequency;

a voltage-to-frequency converter connected to said linear amplification circuit for producing pulses at a frequency related to the instantaneous amplitude of said amplified, phase shifted voltage control signal, but at a frequency substantially lower than the frequency of the pulses produced by said stable signal source; and combining means for combining the signals produced by said voltage-to-frequency converter with the pulses produced by said stable signal source.

23. A closed-loop speed controller as claimed in claim 16 wherein said sensing means is a resistor.

* * * * *